Figure 1:
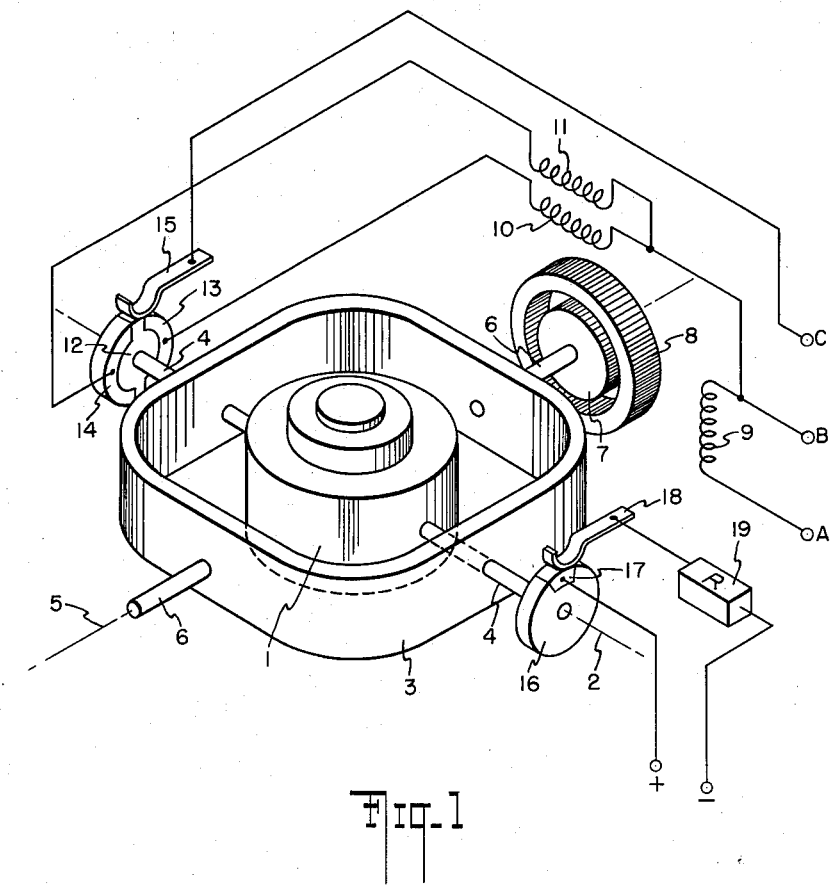

March 7, 1961  A. P. GLENNY  2,973,650
SAFETY DEVICE FOR CONTROL SYSTEMS FOR AIRCRAFT
Filed Nov. 14, 1955  2 Sheets-Sheet 1

INVENTOR
ARTHUR PHILIP GLENNY
BY
Herbert H. Thompson
ATTORNEY

March 7, 1961   A. P. GLENNY   2,973,650
SAFETY DEVICE FOR CONTROL SYSTEMS FOR AIRCRAFT
Filed Nov. 14, 1955   2 Sheets-Sheet 2
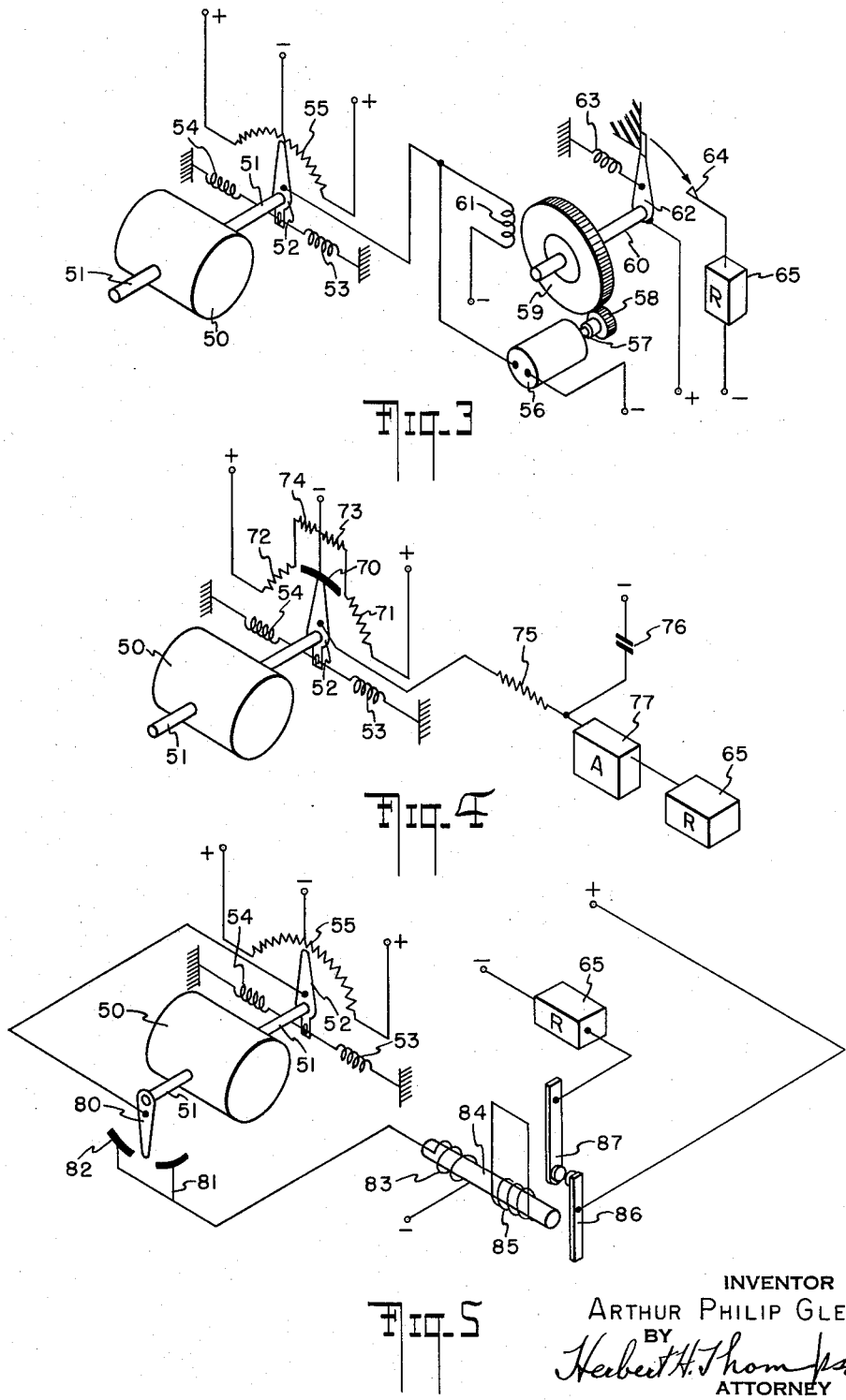
INVENTOR
ARTHUR PHILIP GLENNY
BY
Herbert H. Thompson
ATTORNEY

United States Patent Office 2,973,650
Patented Mar. 7, 1961

2,973,650
SAFETY DEVICE FOR CONTROL SYSTEMS FOR AIRCRAFT

Arthur Philip Glenny, Hanworth, England, assignor to The Sperry Gyroscope Company Limited, Brentford, England, a British company Filed Nov. 14, 1955, Ser. No. 546,753

Claims priority, application Great Britain Nov. 16, 1954

17 Claims. (Cl. 74—5.6)

This invention relates generally to a safety device for an aircraft control system.

In a control system, such as an automatic control system or a power-aided manual control system for a control surface of an aircraft, the control surface is controlled by a servo motor. In such a system the present invention could reduce the likelihood of damage due to a run-away condition of the servo motor such as may happen, for example if a valve controlling the servo motor sticks or if a one-way control signal to be used in the control system is suddenly developed in a control circuit.

Such a run-away condition is particularly dangerous at low altitude especially when coming in to land when there may be insufficient height and air speed to correct a violent change in the attitude of the aircraft.

An object of the invention is to provide means for detecting the beginning of a run-away condition whilst being non-responsive to conditions occurring during normal smooth operation of the control system.

According to the present invention there is provided a safety device adapted to provide a signal when an aircraft turns about an axis through a predetermined angle at a rate in excess of a predetermined rate, comprising turn responsive means adapted to be mounted in an aircraft which means in response to turning of the aircraft at a rate in excess of said predetermined rate produces an output quantity or measure which increases from zero value to a predetermined magnitude within a time interval which is inversely related to the extent of the excess rate, said signal being given when said output quantity or measure reaches said predetermined magnitude, and said device further comprising returning means for causing any output quantity or measure developed during a turn of the aircraft to return towards zero when the rate of turn is less than the predetermined rate or is zero. The output quantity or measure may also increase from zero value to a predetermined magnitude within a time interval which is smaller, the greater the extent of the excess rate, or the sum of the excess rate and the predetermined rate.

During a rate of turn of the aircraft at a dangerous rate i.e. in excess of the predetermined rate, the device produces an output quantity or measure which increases as the dangerous rate of turn persists. When the increasing output quantity or measure reaches a predetermined magnitude, a signal is provided. Conversely, for normal rates of turn, the output quantity or measure must not increase to the predetermined magnitude so that the signal is not produced if a normal rate of turn is maintained for a long period. Thus the predetermined rate needs to be greater than the rates of turn normally intentionally applied to the aircraft.

According to a particular form of the invention there is provided a safety device for a control system for a control surface of an aircraft comprising a gyroscope mounted in a support with three degrees of freedom of angular movement and having one of its axes normally aligned with a particular axis of the aircraft, this position of alignment being referred to as the zero position of the gyroscope, precession control means operable on departure from alignment of the said axis of the aircraft and the gyroscope to precess the gyroscope at a predetermined rate to remove the said misalignment, and a pick-off device adapted to provide a signal when the gyroscope departs from its zero position with respect to the aircraft by more than a predetermined limiting angle.

The signal may be arranged to operate a warning device or automatically to apply safety measures, for example, to render the servo motor inoperative.

In this form of the invention the precession control means may consist of a pick-off device providing a displacement or misalignment signal and a torque motor controlled from the displacement signal to apply a torque directly erecting the gyroscope in the plane of tilt. Alternatively a system may be used in which the rotor of the gyroscope is spun by an induction-motor action, the rotor of the induction motor forming part of the rotor of the gyroscope, the stator being carried not on the rotor case of the gyroscope but on the outer casing of the instrument. In this case the centralising torque arises in a known manner as a component of the torque that spins the gyroscope when this torque is misaligned with the friction torque that tends to slow down the rotor of the gyroscope.

In both these forms of the invention the output quantity or measure may be considered to be the misalignment between the gyroscope and the aircraft or, what amounts to the same thing, the output of the pick-off measuring this misalignment. In a maintained normal turn at a constant rate misalignment occurs at whatever value is required to cause the control arrangements for the torque motor to make the gyroscope precess at the same rate of turn as the aircraft. If, however, a turn is produced and maintained at a dangerous rate the misalignment (i.e. output quantity) grows because the maximum precession rate is less than the dangerous turn rate until it reaches the predetermined magnitude at which the warning signal is given.

In another form of a safety device in accordance with the invention there is provided the combination of a rate of turn gyroscope and an integrating device. The integrating device may be an electric motor which when turned through a certain angle or a certain number of revolutions operates the warning device.

An alternative arrangement may consist of a rate-of-turn gyroscope with a potentiometer pick-off providing a D.-C. voltage depending in value on the deflection of the gyroscope and therefore on the rate of turn of the aircraft, this voltage being applied to a resistance-capacitance network, in which case the voltage on the capacitor is the output quantity. A valve amplifier connected to receive this voltage as an input may then provide the warning signal when the capacitor voltage reaches the predetermined magnitude. Alternatively, the output from a rate gyroscope may be applied to a slugged electromagnetic relay, in which the flux develops in slow response to an applied input current, the relay operating to provide the warning signal when the flux reaches a limiting value.

A warning arrangement may be made dependent on spinning of any gyroscope used. For this purpose a centrifugal switch is operated when the gyroscope attains this operating speed to make a circuit controlling a warning indicator. Preferably the arrangement is that if the gyroscope is not rotating, or if its speed falls below the operating value, the switch is broken and the warning indicator is operated. The safety device accordingly fails-safe.

The embodiment of the invention hereinbefore referred to in which the a gyroscope is mounted with three degrees of freedom of angular movement is sensitive about two axes of control of the aircraft. The alternative form of the invention consisting of a rate gyroscope and an integrating device is sensitive about one axis of a control only so that one must be provided for each axis whose operation is to be monitored.

Means may be provided for rendering the safety device inoperative for example when intentionally applying high rates of turn at safe altitudes. For this purpose there may be applied to the gyroscope during a turn, a torque to give the gyroscope such a precession rate that it remains aligned with its reference position in the aircraft during the turn. The turn may be produced by turn control arrangements in an automatic control system in dependence on a rate of turn set manually by the pilot or determined automatically by the value of some extraneous quantity such as a radio-beam-departure signal. In either case there is a turn controller providing some kind of demand-turn control signal. The torque that is to be applied to precess the gyroscope during such a controlled turn may be derived from this demand-turn signal or from some signal from the turn controller and it may be determined in magnitude and sense by the magnitude and sense of the demand-turn signal, so that the gyroscope is precessed at a rate appropriate for the rate of turn set through the pilot so that the gyroscope remains aligned with its reference position in the aircraft. Alternatively a demand signal may be added to the pick-off signal from the gyroscope in such proportions as to neutralise this signal when the turn is being carried out at the demand rate.

Figure 2:
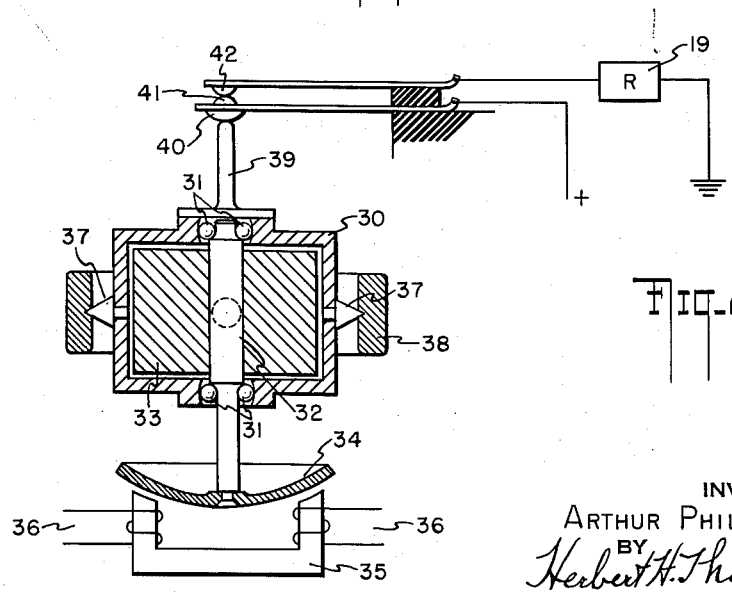

In order that the invention may be readily carried into effect, several of the embodiments previously referred to will now be described, by way of example, with reference to the acompanying drawings, in which:

Figure 1 shows schematically a safety device which comprises a free gyroscope which is precessed by a torque motor, Figure 2 shows partly in cross-section, a safety device comprising a free gyroscope to which a precession torque may be applied via an induction drive, Figure 3 shows the combination of a rate of turn gyroscope and an integrating electric motor, Figure 4 shows a rate of turn gyroscope in combination with a resistance-capacitance network, and Figure 5 shows a rate of turn gyroscope in combination with a slugged relay.

In Figure 1, a free gyroscope comprises a gyroscope rotor casing 1, rotatably mounted about an inner gimbal axis 2 in a gimbal frame 3 by means of shafts 4. The gimbal frame 3 is rotatably mounted about an outer gimbal axis 5 by means of shafts 6. One of the shafts 6 carries the rotor 7 of a torque motor which further comprises a stator 8 provided with stator coils 9, 10 and 11. One of the shafts 4 carries a pick-off 12 which comprises two conductive segments 13 and 14, which segments co-operate with a wiper arm 15. Segment 13 is connected to one end of stator coil 10 and segment 14 is connected to the corresponding end of stator winding 11, the other ends of windings 10 and 11 being connected together and to one phase of a 3-phase supply. The wiper arm 15 is connected to another phase of the 3-phase supply, so that current passes through winding 10 or winding 11 according to with which of the segments 13 and 14 wiper arm 15 is in contact. Stator coil 9 is connected to two phases of the 3-phase supply. The arrangement of coils 10 and 11 is such that the direction in which the torque is applied to shaft 6 by the torque motor is determined by which of the two coils is carrying current which in turn is determined by which segment is in contact with wiper arm 15.

The device is mounted in an aircraft so that the inner gimbal axis 2 is coaxial with the aircraft axis about which protection is required. When the aircraft turns about this axis, the rotor casing 1 tends to remain fixed in space but wiper arm 15 is moved with the aircraft so that it comes into contact with one or other of the segments 13 and 14 to energise the corresponding coil 10 or 11. This cause the torque motor to apply a precession torque about the axis 5 in such a direction as to precess the rotor casing in the direction of turn of the aircraft to reduce the misalignment.

The gyroscope is provided with a maximum precession rate which is a little in excess of normal intentional turning rates of the aircraft about axis 2 so that, for such normal turns, the gyroscope will precess to follow the turn of the aircraft with a misalignment which is just sufficient to make contact within pick-off 12 to effect the necessary torque for the precession.

Should the aircraft make a rapid turn about its axis, for example as a result of a run-away servo-motor, the gyroscope will be unable to precess at a great enough rate to follow the rate of turn of the aircraft and as a result the misalignment between the gyroscope and the aircraft will increase with time. On the other shaft 4 there is mounted a second pick-off 16 comprising a conductive segment 17 and a wiper arm 18 which normally co-operate with each other to maintain a relay 19 energised. When the misalignment of the gyroscope and the aircraft increases to a certain value the wiper arm 18 ceases to make contact with segment 17 and relay 19 becomes de-energised to give a warning signal. The angle of misalignment required to effect the de-energisation of relay 19 is determined by the length of segment 17. Thus the aircraft turns to an angle equal to half that subtended by segment 17 plus the angle through which the rotor is precessed in the time taken for the misalignment to reach the necessary magnitude to break the contact between segment 17 and wiper 18. In the limiting value when the rate of turn of the aircraft is large compared with the maximum precession rate of the gyroscope the angle through which the aircraft turns before the warning signal is given will be equal to half the angle subtended by segment 17.

Referring to Figure 2 which is partly in cross-section, a rotor casing 30 supports, via bearing balls 31, a shaft 32 which has secured thereto a main gyroscope rotor portion 33 and a part-spherical portion 34 which serves as the rotor of an induction motor drive. Induction rotor 34 co-operates with a stator 35 adapted to be secured to the aircraft which stator 35 carries coils 36 to which a three-phase voltage is applied. Rotor 34 and stator 35 together form an induction motor which spins the main part of the gyroscope rotor 33. Rotor casing 30 is mounted via pivot points 37 within a gimbal frame 38 which itself is mounted about a further axis at right angles to the axis provided by pivot points 37. The gyroscope rotor axis about which frictional torques occur centralizes itself through the electrical centre of stator 35 in a known manner. If the aircraft now turns, carrying with it stator 35, a force is applied to the rotor which precesses the gyroscope to its centralized position. However, if the rate of turn of the aircraft exceeds the maximum precession rate of the gyroscope, misalignment occurs between the rotor axis and the centralized position, which misalignment increases with time. Now rotor casing 30 carries an extension 39 which engages a pad 40 so as to hold contacts 41 and 42 closed. If the misalignment of the rotor axis and the centralized axis with respect to the induction field becomes sufficiently large due to maintained excessive turn of the aircraft, the extension 39 ceases to engage pad 40 and therefore allows contacts 41 and 42 to become disengaged. This breaks the circuit to relay 19 so that the warning signal is given. It will be seen that this embodiment is able to give warning of dangerous turns about two of the axes of the aircraft whereas the embodiment as shown in Figure 1 provides for only one axis. However, the embodiment of Figure 1 may be adapted to provide a warning about two axes, i.e. about the inner gimbal axis 2 and the outer gimbal axis 5, by the addition of a torque motor on one of the shafts 4 and a pick-off connected therewith on one of the shafts 6.

Figure 3 shows schematically the combination of a rate gyrscope and an integrating motor, the rate gyroscope basically comprises a rotor casing 50 which is rotatably supported by means of shafts 51. At the end of one of these shafts there is provided a wiper arm 52 which is centralised by means of springs 53 and 54. The wiper arm 52 co-operates with a centre tap potentiometer 55 to form a pick-off. When the aircraft turns about the axis for which this safety device is intended, the wiper arm 52 moves along the potentiometer 55 to provide a voltage which is dependent upon the rate of turn of the aircraft. When the rate of turn of the aircraft exceeds a predetermined value, a coil 61 connected to wiper arm 52 energises a clutch contained within wheel 59 so that the drive connection between motor 56 and shaft 60, via shaft 57 and the pinion 58 is established. The output from the potentiometer besides energising the clutch also energises motor 56, the speed of which is proportional to the magnitude of the voltage from the potentiometer and hence the rate of turn of the aircraft. When the clutch is engaged energisation of motor 56 causes arm 62 which is constrained by spring 63 to move towards contact 64 so that, after a predetermined number of revolutions of the motor, arm 62 makes contact with contact 64 to energise relay 65 and thereby to give a warning signal. As soon as the dangerous rate of turn of the aircraft ceases, the clutch in wheel 59 becomes disengaged and arm 62 is allowed to return to its normal position under the action of spring 63.

Figure 4 uses a similar rate of turn gyroscope comprising rotor casing 50, shafts 51, wiper arm 52 and centralising springs 53 and 54. However, the potentiometer is somewhat differently constructed and comprises a metallic segment 70 and two resistive segments 71 and 72. Segment 70 is connected by means of a resistor 73 to resistive segment 71 and by means of resistor 74 to resistive segment 72. The voltage of wiper arm 52 is applied to a resistance-capacitance network comprising resistor 75 and capacitor 76. The output of this network (i.e. the voltage across capacitor 76) is amplified in amplifier 77 before being applied to relay 65. Provided that the rate of turn of the aircraft lies within the safe limits, wiper arm 52 remains in contact with segment 70 but when the aircraft turns at a dangerous rate wiper arm 52 moves on to segment 71 or 72 according to the direction of turn so that a voltage is applied to resistor 75 and capacitor 76. Capacitor 76 charges at a rate determined by the time constant and the magnitude of the voltage at wiper arm 52 until a predetermined magnitude is reached, whereupon relay 65 operates to give a warning signal. If the rate of turn of the aircraft momentarily exceeds the safe rate, but for a time insufficient for capacitor 76 to charge to the predetermined value, this capacitor will discharge again on returning to segment 70. Thus it is necessary that the dangerous rate of turn should persist for a certain time interval which time interval is inversely related to the magnitude of the excess rate of turn. Resistors 73 and 74 are provided so that the voltage on all parts of segments 71 and 72 are greater than the predetermined magnitude of the voltage on capacitor 76 thereby enabling the warning signal to be given if the wiper arm 52 leaves segment 70 for the required time interval.

Figure 5 shows a similar arrangement with the exception that a slugged relay is used instead of the resistance-capacitance network. Wiper arm 52 is connected to a second wiper arm 80 which engages segment 81 or 82 only when the rate of turn of the aircraft exceeds the predetermined rate. When such a case occurs, the voltage on wiper arm 52 is applied via one or other of segments 81 and 82 to an energising coil 83 which together with a core 84 and a short-circuited winding 85 constitute the slugged relay. Although a sufficient voltage is applied to winding 83, the flux in core 84 is allowed to increase only steadily because of the short-circuited winding 85 until a predetermined magnitude is reached whereupon the relay operates to bring a contact arm 86 into engagement with a contact 87 and thereby to energise relay 65 giving a warning signal. The voltage on wiper arm 52 is arranged to be sufficient to operate the slugged relay when wiper arm 80 is in contact with segment 81 or 82. The slugged relay returns to its de-energised condition when wiper arm 80 ceases to contact segment 81 or 82.

In the embodiments shown in Figures 3 to 5 the rate gyroscope measures the rate of turn of the aircraft about an axis and when this rate exceeds a predetermined value it is integrated or approximately integrated over a time interval inversely related to the magnitude of the rate until the resultant reaches a predetermined magnitude. This is approximately equivalent to a substantially constant predetermined angle of turn of the aircraft. Thus the signal is given when the aircraft has turned through a predetermined angle at a rate in excess of the predetermined rate.

Whereas the embodiments shown in Figures 1 and 2 may give a signal in relation to two axes of the aircraft, the embodiments of Figures 3 to 5 are each operable about one axis only, therefore it would be necessary to have one such safety device for each axis about which a warning is required.

I claim:

1. A safety device adapted to provide a signal when an aircraft turns about an axis at a rate in excess of a predetermined rate comprising gyroscopic turn responsive means adapted to be mounted in said aircraft for precession in response to the rate of turn of said aircraft about an axis thereof, means responsive to the precession of said gyroscopic means for providing an output measure of aircraft rate of turn in excess of a predetermined rate of turn which increases from zero value to a predetermined magnitude within a time interval which is inversely related to the extent of the excess rate, means responsive to said output measure for providing a signal when said output measure reaches said predetermined magnitude, and returning means for causing any output measure developed during a turn of the aircraft to return towards zero when the rate of turn is less than the predetermined rate or is zero.

2. A safety device adapted to provide a signal when an aircraft turns about an axis at a rate in excess of a predetermined rate comprising gyroscopic turn responsive means including a gyroscope mounted in a support with three degrees of freedom of angular movement, said gyroscope having one of its axes normally aligned with a particular axis of the aircraft, precession control means operable on departure from alignment of said aircraft axis and said one axis of the gyroscope to precess the gyroscope at a predetermined rate to remove the misalignment of the axes, and a pick-off device adapted to provide a signal when the misalignment exceeds a predetermined angle due to the rate of turn of the aircraft exceeding the gyroscope precession rate.

3. A safety device of the character described in claim 1 including a relay responsive to said signal.

4. A safety device of the character described in claim 1 including a relay responsive to said output measure for changing the control of the aircraft to an emergency system of control.

5. A safety device of the character described in claim 2 wherein the gyroscope has a rotor and a stator, said rotor being spun by an induction motor action, the rotor of the induction motor forming part of the gyroscope rotor and the stator of the induction motor being adapted for fixedly mounting to the aircraft.

6. A safety device of the character described in claim 1 comprising means including a rate gyroscope which is arranged, when the aircraft rate of turn exceeds the predetermined rate, for supplying a first signal dependent upon the magnitude of the excess, an integrating device responsive to said first signal for providing said output measure whereby a second signal is given when said output measure reaches said predetermined magnitude.

7. A safety device of the character described in claim 6 including a relay responsive to said output measure for changing the control of the aircraft to an emergency system of control.

8. A safety device of the character described in claim 6 wherein said integrating device comprises a variable speed electric motor which controls the output measure and is adapted to be turned through a certain angle before the predetermined magnitude of the output measure is reached, the speed of the motor being determined by the magnitude of the rate of turn of the aircraft.

9. A safety device of the character described in claim 8 including a relay responsive to said output measure for changing the control of the aircraft to an emergency system of control.

10. A safety device of the character described in claim 6 wherein the integrating device comprises a resistance-capacitance network, the voltage output of which constitutes said output measure.

11. A safety device of the character described in claim 10 including amplifying means responsive to the output measure for providing an amplified output measure in accordance therewith and means responsive to the output of said amplifying means for determining when said output measure reaches said predetermined quantity.

12. A safety device of the character described in claim 6 wherein said integrating device comprises an electromagnetic relay which is slow to operate, the output measure being the magnetic flux in the relay magnetic circuit and the predetermined magnitude of the output measure being determined by the relay becoming operated thereby giving the second signal.

13. A safety device of the character described in claim 12 including a second relay responsive to said second signal for changing the control of the aircraft to an emergency system of control.

14. A safety device adapted to provide a signal when an aircraft turns about an axis at a rate in excess of a predetermined rate comprising, gyroscopic turn responsive means adapted to be mounted in said aircraft for precession in response to the rate of turn of said aircraft about an axis thereof, means responsive to the precession of said gyroscopic means for providing a measure of aircraft rate proportional to the turn in excess of a predetermined rate of turn, and means responsive to said measure for providing a signal when the aircraft turns about said axis at a rate in excess of the predetermined rate.

15. A safety device as claimed in claim 14 in which the measure is the displacement of a switch operating member.

16. A safety device adapted to provide a signal when an aircraft turns about an axis through a predetermined angle at a rate in excess of a predetermined rate comprising, gyroscopic turn responsive means adapted to be mounted in said aircraft for precession in response to the rate of turn of said aircraft about an axis thereof, means responsive to the precession of said gyroscopic means for providing a measure of aircraft rate of turn in excess of a predetermined rate of turn, and means responsive to said measure for providing a signal when the aircraft has turned about said axis through a predetermined angle at a rate in excess of the predetermined rate.

17. A safety device adapted to provide a signal when an aircraft turns about an axis at a rate in excess of a predetermined rate, comprising gyroscopic turn responsive means adapted to be mounted in said aircraft for precession in response to the rate of turn of said aircraft about an axis thereof, means responsive to the precession of said gyroscopic means for providing a measure proportional to the integral with regard to time of the aircraft rate of turn in excess of a predetermined rate of turn, and means responsive to said measure for providing a signal when the aircraft turns about said axis at a rate in excess of the predetermined rate.

References Cited in the file of this patent

UNITED STATES PATENTS

| | | |
|---|---|---|
| 2,643,547 | Konet | June 30, 1953 |
| 2,678,564 | Douglas et al. | May 18, 1954 |
| 2,699,681 | Johnson | Jan. 18, 1955 |
| 2,716,894 | Nichols et al. | Sept. 6, 1955 |
| 2,765,435 | McWilliams | Oct. 2, 1956 |
| 2,768,343 | Kutzler | Oct. 23, 1956 |
| 2,817,975 | Granqvist | Dec. 31, 1957 |
| 2,821,087 | Hammon | Jan. 28, 1958 |